United States Patent
Vincze et al.

(10) Patent No.: US 7,021,136 B2
(45) Date of Patent: *Apr. 4, 2006

(54) MASS FLOW METER WITH SYMMETRICAL SENSORS

(75) Inventors: Craig A. Vincze, Reno, NV (US); James Gibson, Gardnerville, NV (US); James D. Parsons, Reno, NV (US); Thomas E. Fehlman, Lake Oswego, OR (US)

(73) Assignee: Heetronix, Reno, NV (US)

( * ) Notice: Subject to any disclaimer, the term of this patent is extended or adjusted under 35 U.S.C. 154(b) by 124 days.

This patent is subject to a terminal disclaimer.

(21) Appl. No.: 10/975,644

(22) Filed: Oct. 27, 2004

(65) Prior Publication Data

US 2005/0087011 A1 Apr. 28, 2005

Related U.S. Application Data

(63) Continuation of application No. 10/608,731, filed on Jun. 27, 2003, now Pat. No. 6,883,370.

(60) Provisional application No. 60/392,380, filed on Jun. 28, 2002.

(51) Int. Cl.
*G01F 1/68* (2006.01)

(52) U.S. Cl. ................................... 73/204.26

(58) Field of Classification Search ............. 73/204.26, 73/204.27, 204.25
See application file for complete search history.

(56) References Cited

U.S. PATENT DOCUMENTS

| 4,366,709 A | 1/1983 | Eiermann et al. ......... 73/204.22 |
| 4,691,566 A | 9/1987 | Aine ....................... 73/204.26 |
| 4,744,246 A | 5/1988 | Busta ...................... 73/204.26 |
| 5,792,952 A | 8/1998 | Ritchart ................... 73/204.27 |
| 6,131,453 A | 10/2000 | Sultan et al. ............. 73/204.26 |
| 6,208,254 B1 | 3/2001 | McQueen et al. .......... 340/603 |
| 6,239,432 B1 | 5/2001 | Parsons ................... 250/338.1 |
| 6,550,325 B1 | 4/2003 | Inushima et al. ........ 73/204.26 |
| 6,557,411 B1 | 5/2003 | Yamada et al. .......... 73/204.26 |
| 6,644,113 B1 | 11/2003 | Kawai et al. ............ 73/204.26 |
| 6,883,370 B1 * | 4/2005 | Vincze et al. ............ 73/204.26 |

OTHER PUBLICATIONS

Workshop on Mass Flow Measurement and Control for the Semiconductor Industry, National Inst. of Standards and Technology, May 15-16, 2000, pp. 1-26.

"How to Monitor Mass Flow", Precision Flow Devices, Inc., Customer Presentation, 1985. (The year of publication is sufficiently earlier than the effective filing date and any foreign priority date.).

(Continued)

*Primary Examiner*—Edward Lefkowitz
*Assistant Examiner*—Jewel V. Thompson
(74) *Attorney, Agent, or Firm*—Koppel, Jacobs, Patrick & Heybl

(57) ABSTRACT

A mass flow meter employs discrete chip-type temperature sensors to sense a fluid flow rate. The sensor can be a semiconductor chip such as SiC or silicon, or thin film tungsten on an AlN substrate. The sensors can be distributed symmetrically with respect to the conduit through which the fluid flows, and can be connected in a four-sensor bridge circuit for accurate flow rate monitoring. An output from the mass flow meter can be used to control the fluid flow.

47 Claims, 6 Drawing Sheets

OTHER PUBLICATIONS

Corte Swearingen, Choosing the Best Flowmeter, Cole-Farmer Instrument Co., Reprint From Chemical Engineering, Jul. 1999.

Corte Swearingen, "Selecting the Right Flowmeter-Part 2", Cole-Farmer Instrument Co Reprint From Chemicl Engineering, Jan. 2001.

"Basics fo Thermal Mass Flow Control", Unit Instruments/Kinetics Application Note, Jun., 1999.

"Curve Tracking and Point Matched", Vishay Intertechnology, Inc., Document No. 33005, May, 2000.

"Mass Flow Controller", Stec Inc., Sales Brochure, 1996. (The year of publication is sufficiently earlier than the effective filing date and any foreign priority date.).

* cited by examiner

MASS FLOW METER WITH SYMMETRICAL SENSORS

RELATED APPLICATION

This application is a continuation of Ser. No. 10/608,731, filed Jun. 27, 2003, which claims the benefit of provisional application Ser. No. 60/392,380, now U.S. Pat. No. 6,883,370, filed Jun. 28, 2002.

BACKGROUND OF THE INVENTION

1. Field of the Invention

This invention relates to mass flow meters, and more particularly to chip-type temperature sensors and four-sensor bridge circuits for mass flow meters.

2. Description of the Related Art

Numerous different methods are employed to measure the flow rate of gases and liquids. They can generally be divided into two categories: those that measure volumetric flow, and those that measure mass flow.

An example of a volumetric flow meter is a tapered tube through which the gas or liquid travels, displacing a float in the tube. When there is no flow, the float rests at the bottom of the tube, sealing its narrower end. As the fluid flows through the tube, the float rises proportionally to the volumetric fluid flow.

A principal problem with volumetric flow meters relates to the measurement of gas flow rate. Changes in the pressure or temperature of the gas can cause inaccuracies in the flow measurements.

Mass flow meters (MFMS) are conventionally used to operate a valve which controls the flow rate of a fluid through a conduit; the combined MFM and valve is referred to as a mass flow controller (MFC). These devices are used in many systems requiring precise control of gas or liquid flow rate, such as in the semiconductor processing industry to deliver gases whose atoms are used to grow or dope semiconductor materials, where gas flow rates are crucial yield parameters. MFCs for the semiconductor industry are discussed in general in "Results from the workshop on Mass flow measurement and control for the semiconductor industry", National Institute of Standards and Technology (NIST), on May 15–16, 2000, results published Jul. 20, 2000. An advantage of MFCs over volumetric flow measurement is that mass flow is less susceptible to accuracy errors due to variations in line pressure and temperature. Known types of MFCs include immersible thermal MFCs, thermal MFCs, and differential pressure MFCs.

Thermal MFCs are the most commonly used type of MFC in the semiconductor processing industry. They can be made from relatively inexpensive components, and provide a good compromise between price and performance. With immersible MFCs, one or more sensors are located directly in the flow stream, while with capillary tube MFCs a capillary tube parallels the main fluid conduit, and one or more sensors are provided on the outside of the tube.

In immersible thermal MFCs, an immersed temperature sensor also acts as a heater, heating up as electric current passes through it. The temperature sensor remains at some known constant temperature when the fluid is not flowing. A flowing fluid reduces the sensed temperature, due to the fluid's carrying heat away from it. The magnitude of the sensed temperature drop is proportional to the fluid's mass flow rate. The sensor may be encapsulated for applications where there is a concern about the sensor material contaminating the flowing fluid stream, or itself being contaminated by the fluid.

In an alternate submersible thermal MFC, a heater is immersed upstream and a temperature sensor downstream. The amount by which the fluid temperature at the sensor location rises due to operation of the upstream heater can be correlated with the fluid's mass flow rate.

In capillary tube thermal MFCs, a known fraction of the incoming flow stream is directed through a heated capillary tube, while the remainder of the flow stream by-passes the capillary tube. The tube is heated by metal wire that is wound around its outer surface at an upstream location, with a temperature sensing winding at a downstream location. Platinum wire is typically used because its resistance change, as a function of temperature, is well known, allowing it to act as both a heater and a temperature sensor. Some MFC manufacturers use thin film platinum resistance temperature devices, consisting of a thin layer of platinum on a thin film insulator (typically alumina) that is deposited onto the outer surface of the capillary tube. The platinum thin film layer changes resistance as a function of temperature.

The gas diverted through the capillary tube absorbs some of the heat from the upstream windings. If no gas is flowing, the tube will be heated uniformly and the up and downstream sensors will sense equal temperatures. Once the gas begins to flow through the tube, its heat absorption capacity cools the upstream portion of the tube while heating the downstream portion; the temperature differential increases with increasing gas flow. On-board or remotely located electronics provide an excitation voltage or current for the sensors, and also monitor the sensor response. For example, if a current is applied, the voltage across the winding is monitored so that the winding's resistance is known. Since the resistance of the sensor varies as a known function of temperature, the temperature at the sensor can be determined from its current and voltage.

Thermal MFCs can be either constant current or constant temperature devices. In a constant current device, the temperature sensors are electrically connected as two of the resistive elements in a bridge circuit; the other elements are passive resistors. The constant excitation current is converted to heat by the sensor resistances, providing a uniform temperature gradient along the capillary tube.

In a constant temperature device, the sensors are again connected in a two-sensor bridge circuit, but the MFC electronics provide a constant voltage rather than a constant current to the bridge circuit. A fluid flowing through the tube causes a reduction in the temperature of the upstream sensor, which reduces its resistance (for a positive temperature coefficient sensor), causing more current to flow through it. The increase in excitation current causes the sensor to give off more heat, which replaces the heat lost to the fluid. The additional current is proportional to the fluid's mass flow rate. Platinum is typically used as the sensing element.

While they are in widespread use, presently available MFCs suffer from one or more of the following characteristics: relatively high temperature sensor drift, low sensitivity, long response times, waste associated with the difficulty of handling ultra-fine platinum wire during manufacture, additional electronics required to quantify the electrical responses of low sensitivity temperature sensors, and errors resulting from the circuitry for low sensitivity temperature sensors, when used in conjunction with high sensitivity sensors.

SUMMARY OF THE INVENTION

In one aspect of the present invention, at least four mutually spaced temperature sensors are disposed to sense the temperature of a fluid flowing through a conduit, and connected in a four-sensor bridge circuit to provide an indication of the fluid's mass flow rate. The sensors are discrete and distributed symmetrically with respect to the conduit, preferably with a pair of sensors on opposite side of the conduit at each of two locations along the flow path.

In another aspect of the invention, the temperature sensors are discrete chip-type elements. Options for the sensors include semiconductor materials such as SiC or silicon, with an oxide interfacing between the chip and the conduit for electrically conductive conduits, and a thin film tungsten layer on an AlN substrate. The sensors can be enclosed by an electrically insulative film, with a circuit on the other side of the film extending through the film to contact the sensors. The sensors can be mounted to the conduit by means of TiW or Ni layers on both the sensor and conduit, each supporting a layer of Au. Various sensor positions can be used, including on the conduit's outer surface, on an inner conduit surface, within openings in the conduit wall, or projecting into the interior of the conduit.

The chip-type sensor enables multiple sensors to be symmetrically positioned around the conduit, either at a single location or at multiple locations along the fluid flow path. The symmetrical placement enables a more accurate temperature sensing, and is useful for both four-sensor bridge circuits and other MFM configurations employing one or more sensor pairs.

The described MFM can be used to govern the fluid flow through the conduit by applying its output to a flow control valve for the conduit.

These and other features and advantages of the invention will be apparent to those skilled in the art from the following detailed description, taken together with the accompanying drawings.

BRIEF DESCRIPTION OF THE DRAWINGS

FIG. 9b is a sectional view taken along the section line 9b—9b of FIG. 9a;

DETAILED DESCRIPTION OF THE INVENTION

Figure 1:
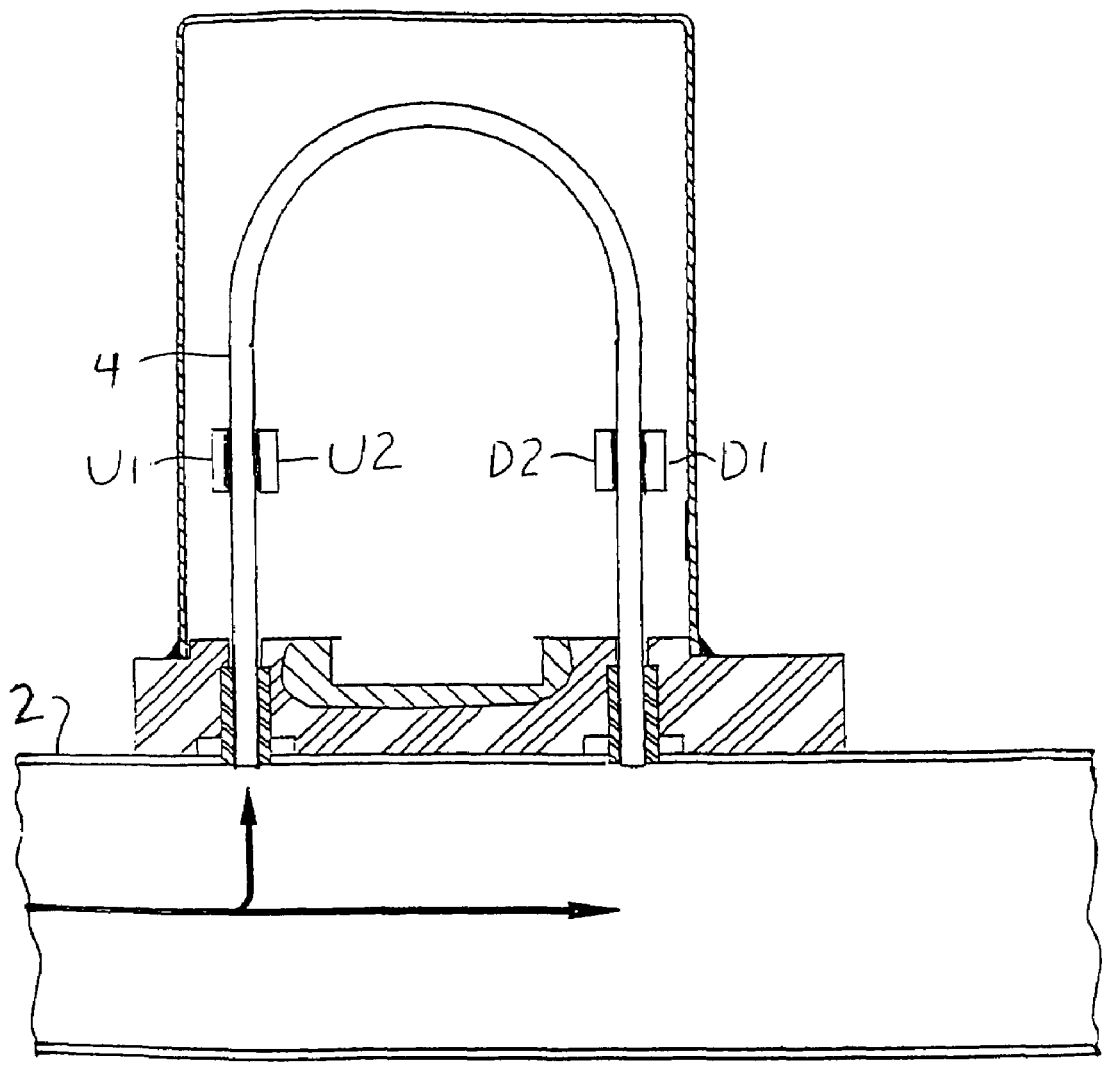
FIG. 1 is a simplified sectional view of a capillary tube MFM in accordance with the invention.

A capillary tube MFM in accordance with one embodiment of the invention is illustrated in FIG. 1. A minor portion of a fluid flow, either gas or liquid, through a main conduit 2 is diverted to a capillary tube 4; the main conduit and capillary tube structure can be conventional. The cross-sections of the main conduit and capillary tube are precisely machined in a conventional manner to assure their fluid flow rates are equal. However, instead of the platinum wire windings previously provided around the capillary tube, a pair of chip-type temperature sensors U1 and U2 are provided at an upstream location along the tube, and another pair of chip-type sensors D1 and D2 at a downstream location along the tube. The sensors of each pair are preferably positioned symmetrically at 180° intervals, on opposite sides of the tube. This allows for a more accurate sensing of the fluid temperature within the tube, in case the fluid temperature varies slightly from one side of the tube to the other. For example, if the sensors were located along a horizontal portion of the capillary tube rather than a vertical portion as shown, rising heat would make the upper sensor detect a slightly higher temperature, and the lower sensor a slightly lower temperature. The symmetrical sensor placements tend to cancel out such discrepancies, and also to enable a more uniform introduction of heat into the conduit. The capillary tube wall has a high thermal conductivity, so that the fluid temperature within the tube is accurately transmitted to the sensors; stainless steel is commonly used for this purpose.

Figure 2:
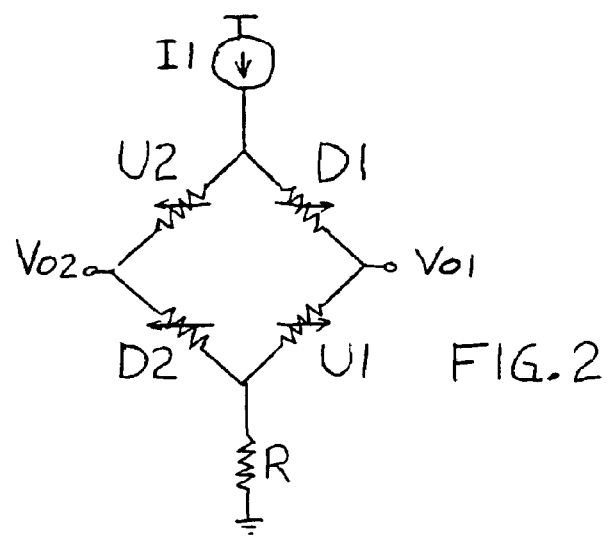
FIG. 2 is a schematic diagram of a four-sensor bridge circuit that provides a MFM output in response to the sensors of FIG. 1.

FIG. 2 illustrates a four-sensor bridge circuit used to sense the mass flow rate of a fluid through the capillary tube of FIG. 1. The bridge circuit is organized into left and right branches, with each branch having upper and lower sections. The left branch includes a pair of the upstream and downstream sensors, with the upstream sensor U2 in its upper section and the downstream sensor D2 in its lower section. The right branch also includes a pair of up and downstream sensors, but their relative positions within the branch are reversed; the downstream sensor D1 is in the upper section, while the upstream sensor U1 is in the lower section.

An actuating current from a current source I1 is fed into the top of the bridge, with current flowing out of the bridge through a resistor R to a ground reference. The bridge outputs are the voltages Vo1 and Vo2 at the connections between D1 and U1 in the right branch, and between U2 and D2 in the left branch, respectively.

Each sensor has the same structure, and accordingly the same temperature coefficient of resistance. A fluid flowing through the capillary tube tends to transfer heat from the upstream sensors U1 and U2 to the downstream sensor D1 and D2. Accordingly, for sensors with a positive temperature coefficient of resistance, this will result in a higher resistance for D1/D2 than for U1/U2. The total resistance of the bridge's left branch will remain equal to the total resistance of its right branch, and equal currents will flow through each branch. However, because of the differences in individual resistance levels, the upper section of the right branch will experience a greater voltage drop across D1 than the voltage drop across the lower section's U1, while conversely the upper section of the left branch will experience a lower voltage drop across U2 than the voltage drop across D2 in its lower section. Thus, Vo1 will be at a higher voltage level than Vo2, with the voltage differential representing the mass flow rate.

The circuit of FIG. 2 achieves a higher degree of sensitivity than prior two-sensor bridge circuits, since Vo2 drops in addition to Vo1 rising in response to fluid flow, thus producing a compound effect. It has been found that a useful monitoring of mass flow rate can be achieved with this circuit without amplifying the sensor outputs.

Figure 3:
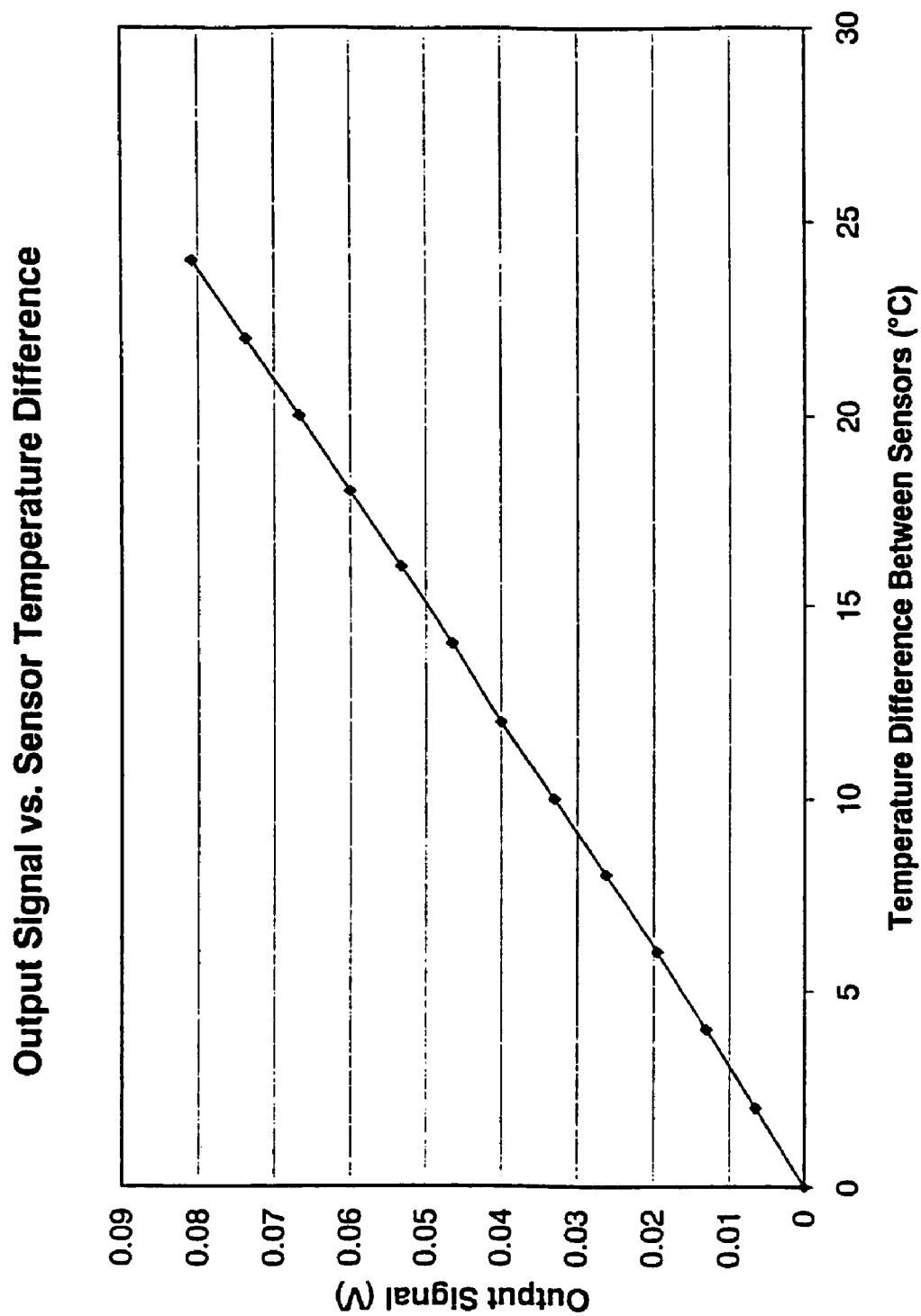
FIG. 3 is a graph illustrating the linear relationship of the temperature between the upstream and downstream sensors to the bridge output.

FIG. 3 illustrates the modeled output voltage differential as a function of the temperature difference between upstream and downstream sensors for a four-sensor bridge circuit. The curve is substantially linear, so that only two points along the curve need be determined to know the flow rate over the full linear range, avoiding the need for a more complicated equation that might have to be embedded in a microprocessor microchip.

Figure 4:
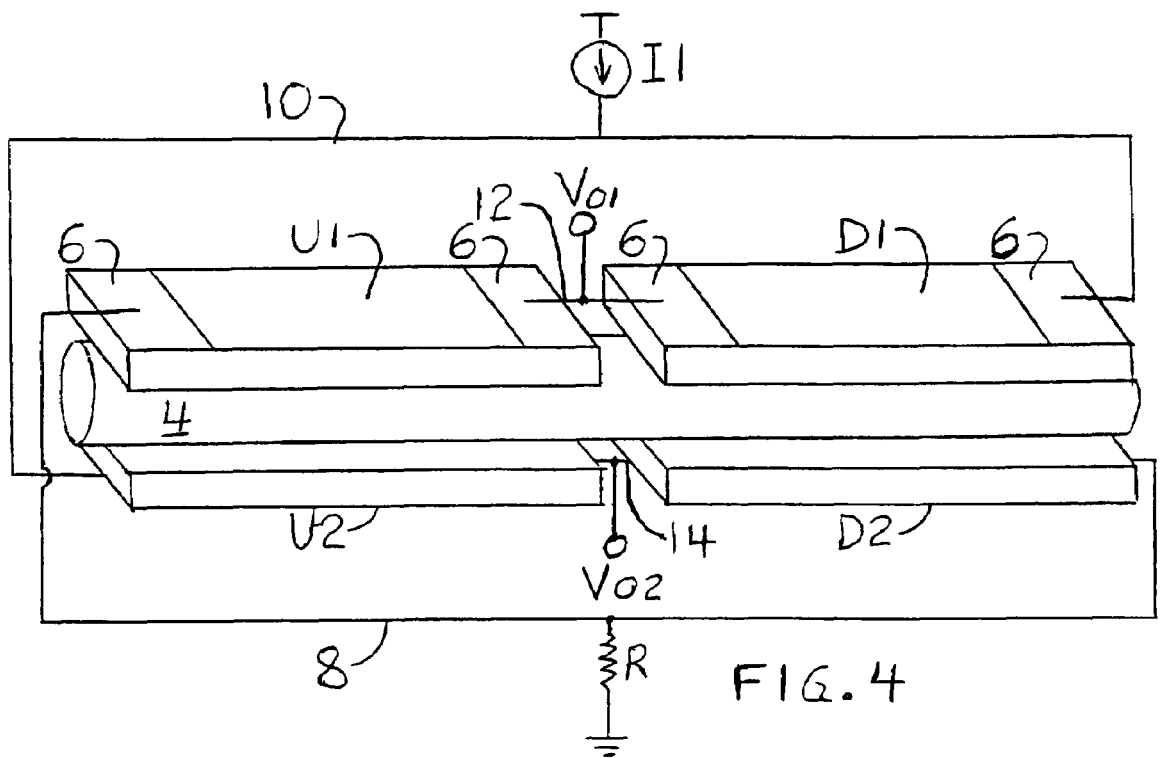
FIG. 4 is a simplified combined perspective view and schematic diagram of chip-type temperature sensors arranged in a MFM four-sensor bridge in accordance with the invention.

FIG. 4 illustrates an arrangement of chip-type temperature sensors on the fluid conduit 4 in accordance with the invention. SiC and silicon chips are preferred; they have similar sensitivities in the positive regions of their temperature coefficients of resistance. SiC is capable of a higher operating temperature without diffusion than is silicon. Other semiconductor materials may also be employed, but in general they tend to be harder to use, do not form native oxides, and are no more sensitive than SiC or silicon. Electrical contact pads 6 are provided as metallization layers on opposite ends of each chip, and enable the connection of electrical leads to the chips so that excitation voltages or currents can be applied, and the response of the chips monitored.

The lead wire arrangement shown in FIG. 4 corresponds to the four-element bridge circuit of FIG. 2, with one end of upstream chip U1 connected by lead 8 to the downstream end of the downstream chip D2, the upstream end of the other upstream chip U2 connected by lead 10 to the downstream end of the other downstream chip D1, the facing ends of U1 and D1 connected together by lead 12, the facing ends of U2 and D2 connected together by lead 14, I1 applied to lead 10, resistor R connected to lead 8, Vo1 taken from lead 12, and Vo2 taken from lead 14. Although leads 12 and 14 are illustrated as being short, in practice their lengths would be considerably extended, such as by connecting them to pin-out electronics. This can increase the thermal path length between the connected chips to a point at which the leads can be considered substantially non-thermally conductive for purposes of mass flow rate monitoring, thus preventing an additional thermal path between the chips that would interfere with the measurements. The other leads would be arranged in a similar fashion.

Figure 5:
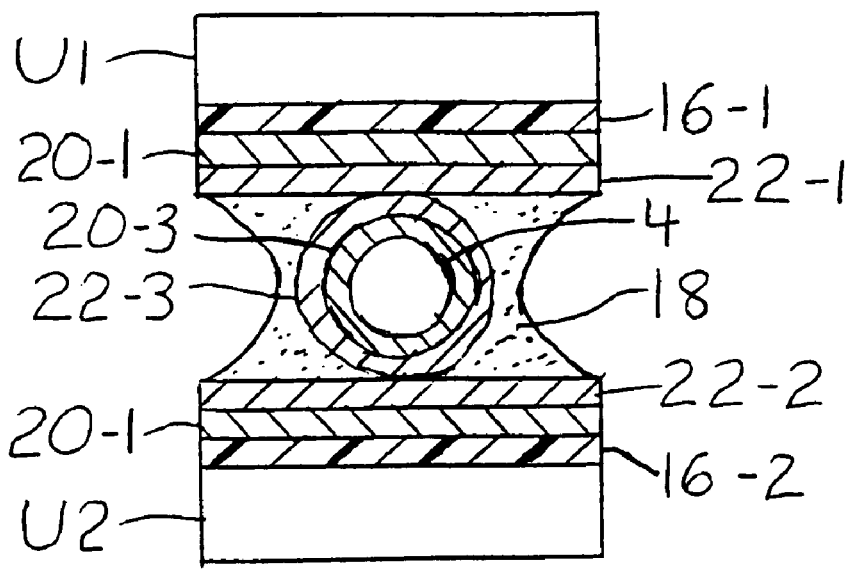
FIG. 5 is a sectional view of the structure illustrated in FIG. 4, with the addition of an insulative sleeve around the sensors.

FIG. 5 is a not-to-scale sectional view illustrating how the symmetrically arranged chips U1 and U2 can be bonded to the conduit 4. Electrically insulating but thermally conductive layers 16-1 and 16-2 are formed on the faces of U1 and U2, respectively, to allow the electrically conductive chips to be in direct contact with the stainless steel conduit 4 and bonding material, without creating an electrical short circuit. The electrically insulating layers 16-1 and 16-2 can be monolithically integrated, deposited or bonded onto the chip sensors. With SiC or silicon used for the sensors, the electrically insulating layers are preferably formed by oxidizing the surfaces of the chips that are to face the conduit.

A thermally conductive bonding material 18 adheres the chip-type sensors to the conduit. If the bonding material, typically a solder, will not adhere directly to the chip oxide and conduit material, a suitable intermediary bonding material is first deposited onto these surfaces. In FIG. 5 the bonding material 18 is eutectic gold/tin solder, which will not adhere directly to the electrically insulating oxide layers 16-1 and 16-2, or to the stainless steel tube 4. To produce a good bond, layers 20-1 and 20-2 of TiW or Ni, preferably about 400–1500 Angstroms thick, are deposited on the upper and lower chip oxide layers 16-1 and 16-2, respectively. A similar TiW or Ni layer 20-3 is deposited around the outer surface of the tube 4. Gold (Au) layers 22-1, 22-2 and 22-3, preferably about 4000–25000 Angstroms thick, are then deposited on the intermediate TiW or Ni layers 20-1, 20-2 and 20-3, respectively. The eutectic gold/tin solder 18, which adheres to the Au surfaces, can then be applied to bond the two chips U1 and U2 to opposite sides of the tube 4. Gold is a preferred bonding material because it has a very high thermal conductivity and does not readily oxidize. Numerous solders are available for gold-to-gold bonding.

For further protection of the overall assembly, and to provide additional support to hold the sensors in place, the assembly can be shielded in an insulative sleeve 24, such as the flexible polyimide film provided under the trademark KAPTON® by E.I. DuPont de Nemours and Company. Contact pad metallizations 26 are deposited or printed on the outer surface of the sleeve in alignment with the sensor contacts. When the assembly is heated, the contact metal 26 migrates through the sleeve to mate with the sensor contacts, thus providing a vehicle for external electrical access to the sensors.

Figure 6:
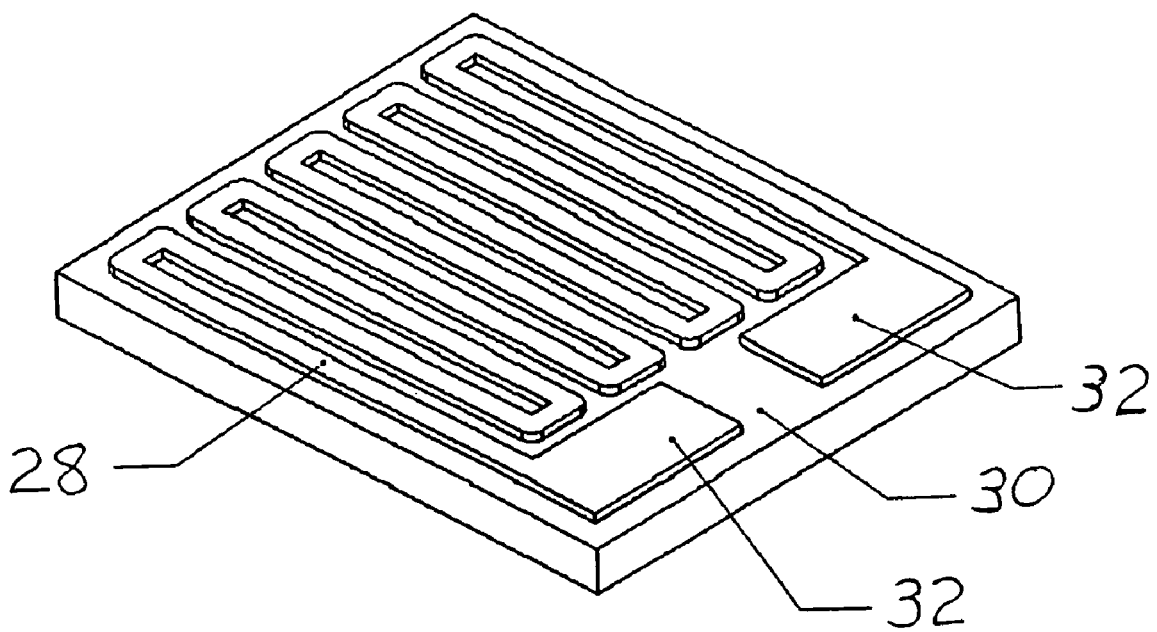
FIG. 6 is a perspective view of an alternate chip-type sensor configuration, with a thin film tungsten sensor on an AlN substrate.

Another advantageous sensor chip configuration, illustrated in FIG. 6, consists of a tungsten thin film 28 deposited as the sensor element on an insulating AlN substrate 30. The tungsten conductor preferably traces a serpentine pattern on the substrate 30 for even heat distribution when a heating current is applied to it, and terminates at each end in a pair of spaced contact pads 32. Tungsten provides a high degree of thermal sensitivity, and can tolerate a wide temperature range when used in conjunction with an AlN substrate because of their closely matched temperature coefficients of expansion. The thin film tungsten layer is generally about 10–1000 microns thick. Such a temperature sensor is the subject of copending patent application Ser. No. 10/608,737, filed on the same date as the present application in the name of James D. Parsons, one of the present inventors.

Figure 7:
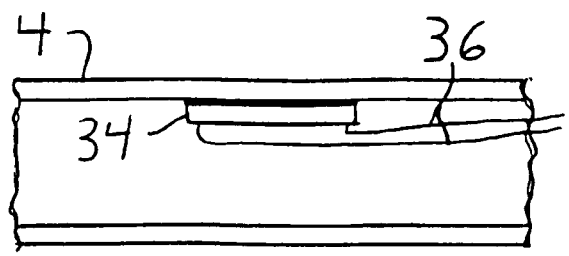
FIG. 7 is a simplified sectional view of a sensor chip mounted to the interior wall of a fluid conduit.

FIG. 7 illustrates the positioning of a sensor 34 in accordance with the invention along an interior wall of the conduit 4. The sensor is bonded to the wall in a manner similar to an exterior sensor, with or without the addition of an electrically insulating layer between the sensor and conduit wall as determined by the type of material used for the sensor. Sensor lead wires 36 can be brought out through a remote location of the conduit, or directly through bushings in the conduit wall. The placement of a sensor inside the conduit as illustrated allows for very rapid and accurate tracking of the temperature of the fluid flowing through the conduit, but requires that neither the sensor nor the bonding material be reactive with the fluid.

Figure 8:
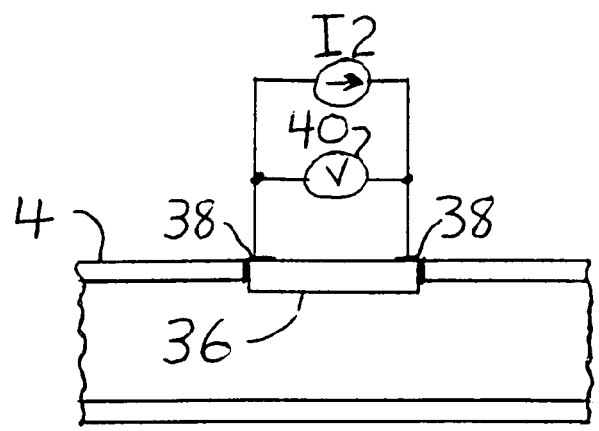
FIG. 8 is a simplified sectional view and schematic diagram of a sensor mounted within an opening in a fluid conduit.

Refer now to FIG. 8, another alternative for mounting a sensor 36 is illustrated, with the sensor bonded within an opening in the wall of conduit 4 so that its surface facing the conduit interior is directly heated by the fluid. The sensor contacts 38 are on its exterior surface and easily accessible. The sensor, and the conduit opening within which it fits, should be small enough that the sensor does not protrude too far into the conduit, and a good bond can be obtained around its periphery to hold the sensor in place and prevent fluid loss from the conduit.

The sensor can be part of a four-element bridge as described above, either the upstream or downstream element of a two-sensor MFM, or operate by itself in a single-sensor MFM. A current source 12 is shown directing a current through the sensor, with a voltmeter 40 monitoring the sensor's voltage response to the applied current. A comparison of the applied current and measured voltage yields the sensor's resistance; this can be compared with either its resistance at zero flow, or with the resistance of an up or downstream sensor, to determine the fluid mass flow rate within the conduit.

Figure 9B:
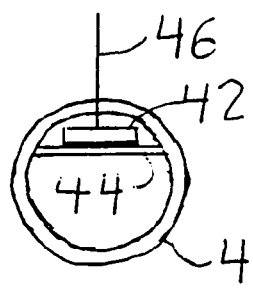
Figure 9A:
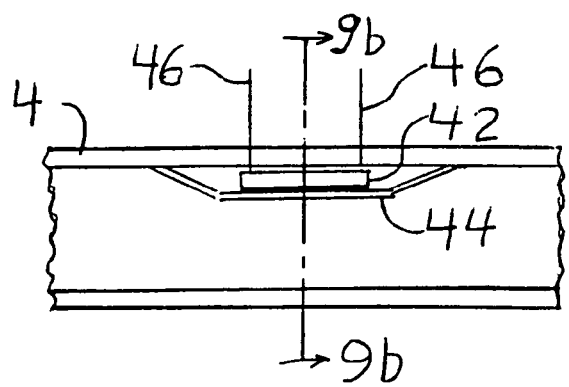
FIG. 9a is a sectional view of a MFM sensor mounted within an environmental shield in the interior of a conduit.

To prevent the fluid from reacting with the sensor or its bonding materials, this preserving the sensor and/or preventing contamination of the fluid, a chip-type sensor 42 depicted in FIGS. 9a and 9b can be mounted to the interior of a protective shield 44 that forms a closed compartment within the conduit 4, sealed off from fluid flowing through the conduit. For a stainless steel conduit, the shield 44 would preferably also be stainless steel. Lead wires 46 can extend up from the sensor, through bushings (not shown) in the conduit wall.

Figure 10:
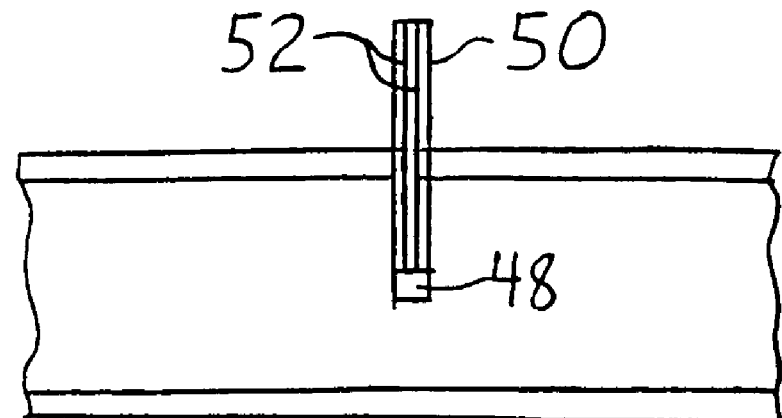
FIG. 10 is a sectional view of a sensor in accordance with an embodiment of the invention immersed within a fluid flow tube.

FIG. 10 illustrates an immersible type thermal MFM in which a semiconductor or thermistor chip-type sensor 48 is held in the fluid flow stream within the conduit 4 at the end of a ceramic die substrate 50. The substrate bears electrical leads 52 formed from thin layers of deposited metal, which allow an excitation voltage or current to be applied to the sensor 48, and also allow on-board or remotely located MFM electronics to monitor the sensor's resistance.

Figure 11:
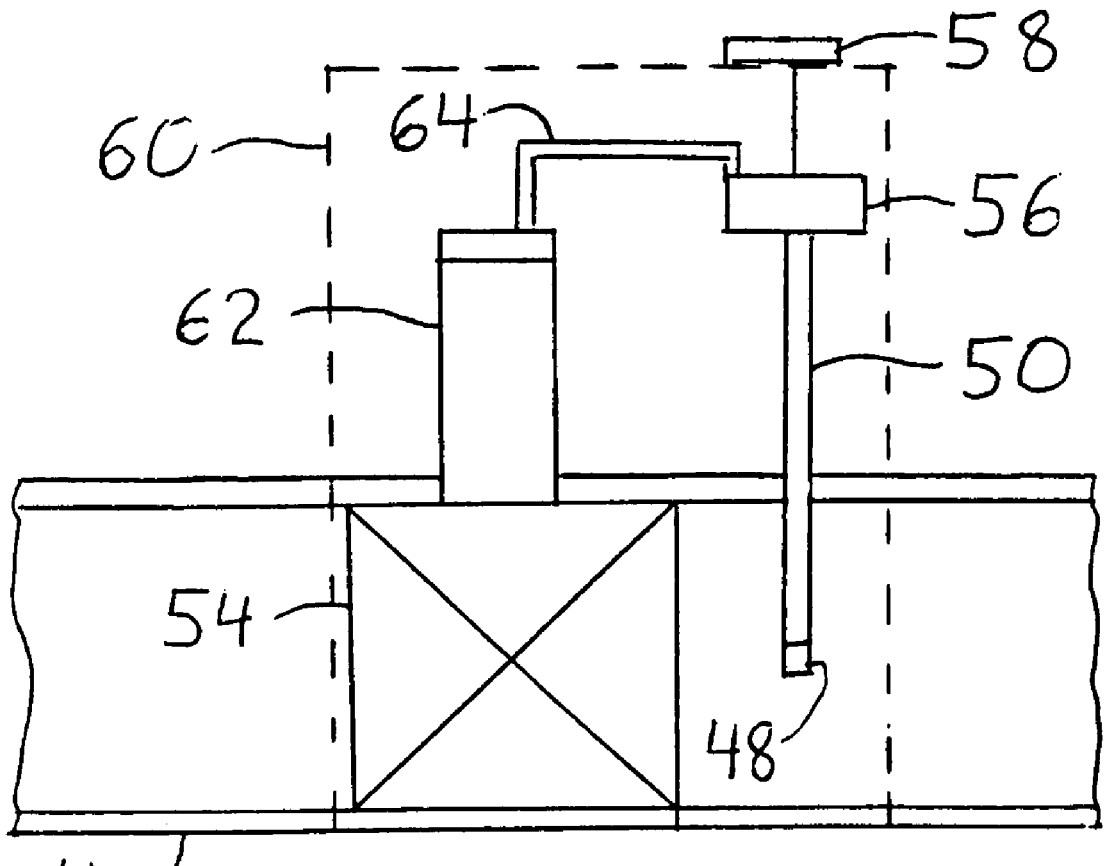
FIG. 11 is a simplified sectional view of a MFC system incorporating a MFM of the present invention.

FIG. 11 illustrates an MFC which utilizes the immersible MFM of FIG. 10, although it can also be used with any of the other MFM embodiments contemplated by the invention. A flow control valve 54 is located upstream from the immersed sensor 48, with the sensor's voltage-current characteristics monitored by an electronics package 56 via the lead traces (not shown) on substrate 50. An electrical interface 58 on the exterior of a housing 60 for the MFC system provides electrical inputs and outputs to the system. The electronics 56 provide a signal to the valve control actuator 62 via lead wires 64 to control the operation of the valve in response to the detected fluid mass flow rate, allowing the flow rate to be maintained at a desired level despite disturbances such as upstream or downstream line pressure or temperature variations.

While particular embodiments of the invention have been shown and described, numerous variations and alternate embodiments will occur to those skilled in the art. Accordingly, it is intended that the invention be limited only in terms of the appended claims.

We claim:

1. A mass flow meter (MFM) structure, comprising:
   a conduit for conducting a fluid flow, and
   at least four mutually spaced temperature sensors disposed to sense the temperature of a fluid flowing within said conduit and arranged in upstream and downstream pairs along said conduit, with the sensors of each pair located the same distance along the conduits length and symmetrically on opposite sides of the conduit from each other, said sensors connected in a 4-sensor bridge circuit to sense the mass flow rate of a fluid flowing through said conduit.

2. The MFM structure of claim 1, wherein said sensors are discrete and are distributed symmetrically with respect to said conduit.

3. The MFM structure of claim 1, said sensors comprising semiconductor chips.

4. The MFM structure of claim 3, said sensors comprising SiC chips.

5. The MFM structure of claim 4, further comprising a SiC oxide interfacing between said SiC chips and said conduit.

6. The MFM structure of claim 3, said sensors comprising silicon chips.

7. The MFM structure of claim 6, further comprising a silicon oxide interfacing between said silicon chips and said conduit.

8. The MFM structure of claim 1, further comprising an electrically insulative film enclosing said sensors, and a circuit on the exterior of said film and extending through the film to contact said sensors.

9. The MFM structure of claim 1, wherein said sensors are mounted to said conduit by respective first layers on said sensors and conduit of a material selected from the group comprising TiW and Ni, and respective second layers on said sensors and conduit of Au, with said sensor and conduit second layers bonded to each other.

10. The MFM structure of claim 9, wherein said sensors comprise semiconductor chips, further comprising an oxide of said semiconductor interfacing between said sensors and said sensor first layers.

11. The MFM structure of claim 1, said sensors comprising thin film tungsten layers on respective AlN substrates.

12. The MFM structure of claim 1, said bridge circuit including extended leads between said upstream and downstream sensors long enough to be substantially non-thermoconductive.

13. The MFM structure of claim 1, wherein said sensors include respective AlN substrates that are mounted to said conduit.

14. The MFM structure of claim 1, further comprising electronic circuitry for actuating said sensors and determining the mass flow rate of a fluid flowing through said conduit from said sensors.

15. The MFM structure of claim 14, wherein said electronic circuitry operates without amplification of the sensor outputs.

16. The MFM structure of claim 14, further comprising a control valve governing the fluid flow through said conduit under the control of said circuitry.

17. The MFM structure of claim 1, wherein said sensors are mounted inside said conduit on protective shields and protected from the enviornment within the conduit by said shields.

18. The MFM structure of claim 1, wherein said sensors are connected directly to each other in said bridge circuit.

19. A mass flow meter (MFM) comprising:
   a conduit for conducting a fluid flow,
   a plurality of temperature sensors disposed to sense the temperature of a fluid flowing through said conduit and arranged in upstream and downstream pairs along said conduit, with the sensors of each pair located the same distance along the conduit's length and symmetrically on opposite sides of the conduit from each other, each sensor comprising an AlN substrate bearing a temperature sensing circuit, and
   electronic circuitry for actuating said sensors and determining from said sensors the mass flow rate of a fluid flowing through said conduit.

20. The MFM of claim 19, said temperature sensing circuits comprising respective thin film tungsten layers on said AlN substrates.

21. The MFM of claim 19, wherein each AlN substrate is mounted to the outer surface of said conduit to conduct heat from said conduit to its respective temperature sensing circuit.

22. The MFM of claim 19, further comprising a control valve governing the fluid flow through said conduit under the control of said circuitry.

23. A fluid mass flow meter (MFM), comprising:
a conduit for conducting a fluid flow,
a plurality of discrete temperature sensors carried by to said conduit to sense the temperature of a fluid within said conduit and arranged in upstream and downstream pairs along said conduit, with the sensors of each pair located the same distance along the conduit's length and symmetrically on opposite sides of the conduit from each other, and
electronic circuitry for actuating said at least one sensor and sensing the mass flow rate of a fluid flowing through said conduit from said sensors.

24. The MFM of claim 23, each said sensor comprising a semiconductor chip.

25. The MFM of claim 24, each said semiconductor chip comprising a SiC chip.

26. The MFM of claim 25, further comprising a SiC oxide interfacing between each SiC chip and said conduit.

27. The MFM of claim 24, each said semiconductor chip comprising a silicon chip.

28. The MFM of claim 27, further comprising a silicon oxide interfacing between each silicon chip and said conduit.

29. The MFM of claim 23, each said sensor comprising a thin film tungsten layer on a respective AlN substrate.

30. The MFM of claim 23, further comprising an electrically insulative film enclosing each said sensor, and a circuit on the other side of said film and extending through the film to contact each sensor.

31. The MFM of claim 23, wherein each said sensor is mounted to said conduit by respective layers on said sensor and conduit of a material selected from the group comprising TiW and Ni, and respective second layers on said sensor and said conduit of Au, with said sensor and conduit second layers bonded to each other.

32. The MFM of claim 31, wherein each said sensor comprises a respective semiconductor chip, further comprising an oxide of said semiconductor interfacing between said sensor and said first sensor layer.

33. The MFM of claim 23, wherein said electric circuitry senses the temperature within said conduit as a function of the sensor resistance.

34. The MFM of claim 23, wherein each said sensor is mounted to the outer surface of said conduit in thermal communication with a fluid flowing through the conduit.

35. The MFM of claim 23, wherein each said sensor is mounted within a respective opening in a wall of said conduit.

36. The MFM of claim 23, wherein each said sensor is mounted to an inner surface of said conduit.

37. The MFM of claim 23, wherein each said sensor is mounted inside said conduit on a protective shield and protected by said shield from the environment within said conduit.

38. The MFM of claim 23, wherein each said sensor projects into the interior of said conduit.

39. The MFM of claim 23, wherein said temperature sensors are electrically connected in a bridge circuit.

40. The MFM of claim 39, wherein said sensors are connected directly to each other in said bridge circuit.

41. The MFM of claim 39, said bridge circuit incorporating a pair of upstream temperature sensors and a pair of downstream temperature sensors.

42. The MFM of claim 23, further comprising a control valve governing the fluid flow through said conduit under the control of said circuitry.

43. A fluid temperature sensor, comprising:
a conduit, and
a plurality of discrete temperature sensors on said to a conduit in upstream and downstream sensor pairs, with the sensors of each pair located the same distance along the conduit's length and symmetrically on opposite sides of the conduit from each other,
each said sensor electrically connected to sense the temperature of a fluid flowing through said conduit.

44. The fluid temperature sensor of claim 43, wherein each said temperature sensor is bonded to said conduit through a thermally conductive insulator.

45. The fluid temperature sensor of claim 43, wherein said upstream and downstream temperature sensors are connected in a 4 sensor bridge network.

46. The fluid temperature sensor of claim 45, wherein said sensors are connected directly to each other in said bridge circuit.

47. The fluid temperature sensor of claim 43, implemented as a mass flow meter which uses said sensed temperature as an indication of the mass flow rate of a fluid flowing through said conduit, further comprising a controller connected to control said fluid flow rate as a function of the indicated mass flow rate.

* * * * *